C. F. EULER.
PROCESS OF MAKING COMBUSTIBLE GAS.
APPLICATION FILED APR. 4, 1916.
1,273,050.   Patented July 16, 1918.
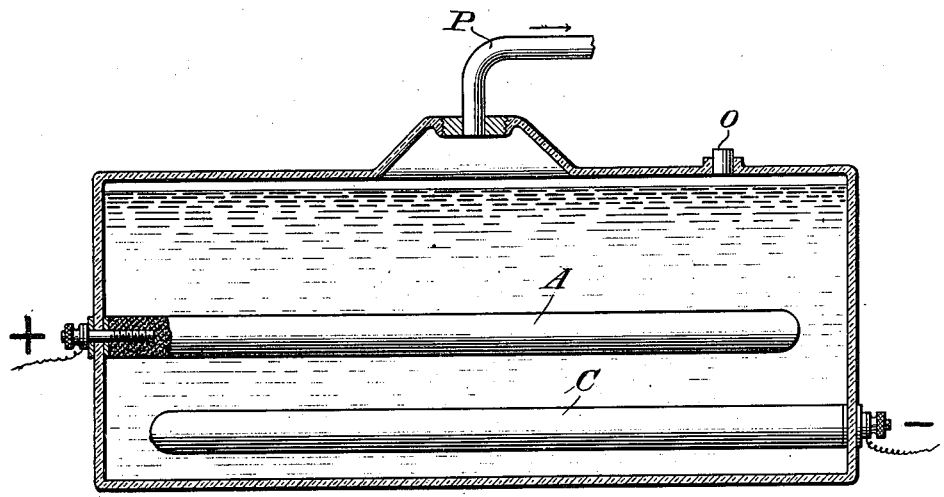
WITNESS
J.H. Crawford
INVENTOR
C.F. Euler,
BY Victor J. Evans
ATTORNEY

UNITED STATES PATENT OFFICE.

CLIDE F. EULER, OF TOPEKA, KANSAS.

PROCESS OF MAKING COMBUSTIBLE GAS.

1,273,050.    Specification of Letters Patent.    Patented July 16, 1918.

Application filed April 4, 1916. Serial No. 88,927.

*To all whom it may concern:*

Be it known that I, CLIDE F. EULER, a citizen of the United States, residing at Topeka, Shawnee county, State of Kansas, have invented new and useful Improvements in Processes of Making Combustible Gas, of which the following is a specification.

The present invention relates to the production by the aid of electrolytic decomposition, of a gas suitable for use as a combustible, either for use in a gas engine, or for burning under a boiler, or in any other manner suitable for the production of heat, or for use as a reducing agent.

The present invention contemplates the decomposition of water, with the production of gas which is readily combustible, this decomposition being effected by an electrolytic treatment of the water, and being aided and facilitated by the presence of an activating agent, of which several types may be employed. The activating agent employed may be under some conditions, copper sulfate, which will be dissolved in the water, or in other cases, a finely divided metallic substance may be employed, such as platinum black, which will be stirred in the liquid in the odinary way, and the passage of the current through the liquid, and the liberation of bubbles of gas in the liquid will maintain the activating agent distributed throughout the liquid, whereby the effect thereof will be maintained.

It is already known that by passing an electric current through acidulated water, hydrogen will be evolved at one of the poles, and oxygen at the other.

In the accompanying drawing I have shown a simple form of apparatus for carrying out my process, the figure being a vertical section, showing the electrodes, and gas exit pipe in elevation.

In the preferred form of the invention, I preferably employ carbon poles in the decomposing cell, the carbon anode A being placed above and parallel to the carbon cathode C, and the leads preferably coming in from opposite ends of the electrodes. At O is shown a filling opening, closed by a stopper.

In this way the hydrogen gas is given off at the surface of the lower electrode or cathode, and in rising passes into contact with the anode, and the oxygen there liberated, thereby creating more or less agitation of the liquor and preventing polarization of the anode.

By causing the gas from the cathode to meet the gas, as being liberated at the anode, an extremely thorough mixing of the two gases is effected, thereby producing an explosive gas mixture, in which the two gases are very thoroughly mixed.

The gas can be led off through any suitable pipe P to a place of storage or use.

The apparatus employed may include a single cell only, or may include a number of cells, which cells may all be included within a single container if so desired, by the use of partitions in order to make several compartments. The receptacles of which the cells are formed will preferably be made of a suitable insulating material such as glass or baked clay, porcelain or the like, although I do not limit myself to these particular materials.

While I have described the use of a catalytic agent, I wish to state that "pure" water alone (well water, spring water, river water, etc.) can be employed if so desired, although not with as good results. This is perhaps due to the fact that there is a loss of efficiency in the current passing from the anode to the liquid and from the liquid to the cathode.

What I claim is:—

A process of generating an intimate mixture of hydrogen and oxygen, which comprises passing an electric current through an electrolyte consisting essentially of water, free from such amounts of salts, alkalis and acids as would liberate large quantities of gases other than oxygen and hydrogen, while causing uniform amounts of current to flow from the anode to the cathode and through all parts of the intervening liquid, by maintaining a uniform resistance through all parts of such intervening liquid, causing the gas as liberated uniformly at all parts of the length of the cathode to rise through said intervening liquid to said anode, and thereby come into contact with the gas as being liberated uniformly at all parts of the length of said anode, whereby said two gases are very thoroughly mixed, and withdrawing the mixed gases from the electrolytic generator without admixture with extraneous gases, substantially as hereinabove described.

In testimony whereof I affix my signature.

CLIDE F. EULER.